Dec. 7, 1926.  1,609,698
G. CONSTANTINESCO
CLUTCH AND UNIDIRECTIONAL DRIVING DEVICE
Filed July 25, 1923   2 Sheets-Sheet 1

INVENTOR
G. Constantinesco
by
Atty

Dec. 7, 1926.                                                    1,609,698
G. CONSTANTINESCO
CLUTCH AND UNIDIRECTIONAL DRIVING DEVICE
Filed July 25, 1923        2 Sheets-Sheet 2
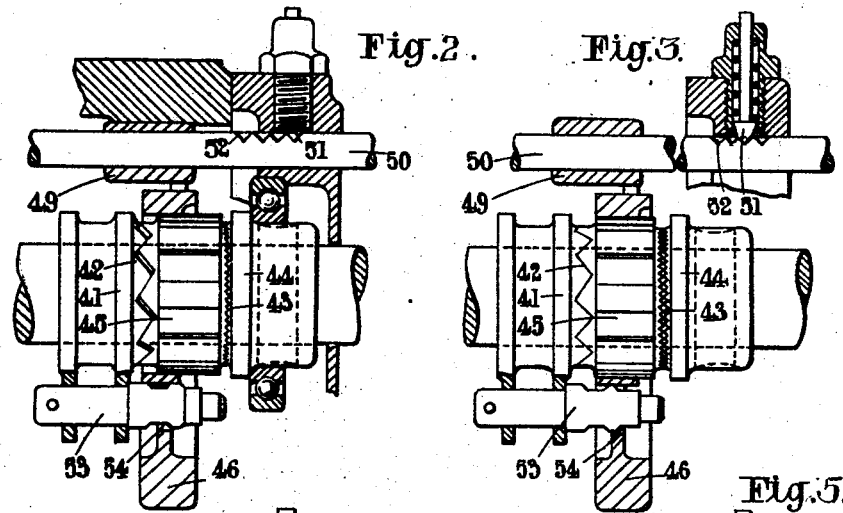
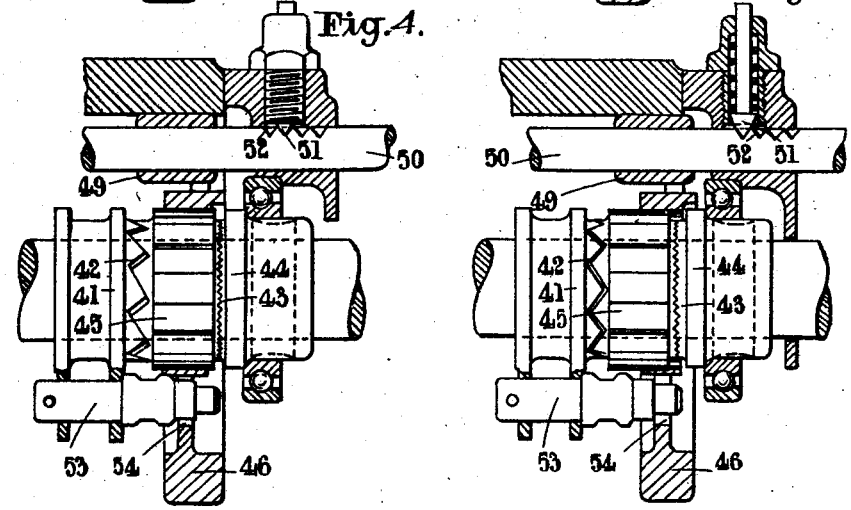
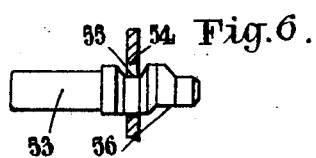
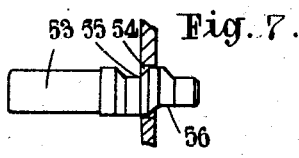
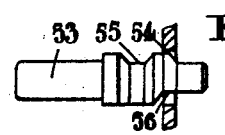
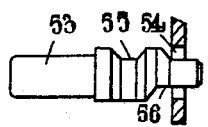
Inventor
G. Constantinesco Patented Dec. 7, 1926.

1,609,698

UNITED STATES PATENT OFFICE.

GEORGE CONSTANTINESCO, OF WEYBRIDGE, ENGLAND.

CLUTCH AND UNIDIRECTIONAL DRIVING DEVICE.

Application filed July 25, 1923, Serial No. 653,774, and in Great Britain September 11, 1922.

The present invention relates to unidirectional driving devices for various purposes and is applicable to devices intended to drive in two directions, or giving a free wheel or locking position as may be required.

The invention is suitable for unidirectional reversible driving devices in cases in which it is required to transmit considerable forces with as little backlash as possible, and is especially applicable to apparatus for transmitting motion from a steadily rotating shaft to a driven shaft rotating at variable speed, the resisting torque being either variable or constant.

The invention is applied to unidirectional driving devices of the type in which an intermediary or sliding member is situated between an oscillating member and a rotary member and arranged so that relative angular movement between the sliding member and the oscillating member causes alternate movement of said sliding member at right angles to the movement of rotation, so that for relative motion between the oscillating member and the intermediary member, jamming takes place in one direction, while on the reverse movement of the oscillator, the rotor is allowed to overrun the slider and oscillator.

When such mechanism is applied for the purpose of obtaining continuous rotation of a rotor driven by a rapidly oscillating member, difficulty is experienced in preventing backlash and in causing sufficiently rapid disengagement between the slider and the rotor.

The object of the invention is to construct a unidirectional driving mechanism in such a manner that these difficulties are avoided.

In order to better understand the invention, it is necessary to define certain angles which are of extreme importance if proper functioning of the apparatus is to be obtained.

In apparatus of the type to which this invention relates, certain definite proportions and angles of inclination of the teeth on the two sides of the slider when teeth are employed, or the angle of inclination of the teeth on one side and the angle of friction on the other, are of extreme importance. The angle of inclination of the driving surfaces with the plane of rotation plus the angle of friction between the driving surfaces I have termed the "driving angle", in examples in which the movement of the slider takes place axially.

The present invention consists in apparatus of the type indicated in which the co-operating faces of the oscillating member are constructed so that the driving angle between the oscillating member and the sliding member is smaller than the driving angle between the sliding member and the rotor by an amount just sufficient to secure, that when the oscillating member is oscillating at high frequency alternate engagement and jamming and disengagement of said three members is obtained in order to convert oscillating movement into intermittent rotary movement with a minimum of backlash.

The invention also consists in such unidirectional driving mechanism in which the sliding member has symmetrical teeth on both sides, the angles of inclination of the teeth between the sliding member and the oscillating member being less than the angles of inclination of the teeth between the slider and the rotor.

The invention also consists in the provision of suitable stops to limit the movement of the slider relatively to the oscillator in one direction or the other, as desired, in order to provide reversing the mechanism.

The invention also consists in arranging the apparatus so that the inertia of the slider tends to assist engagement and disengagement between the slider and the rotor.

The invention further consists in providing an additional mass or inertia member moving with the slider in its rotation and arranged so that relative longitudinal movement is allowed between the slider and the additional inertia member.

The invention also consists in an improved clutch, comprising a sliding member seated between the oscillating member and a rotating member, and arranged so that relative movement of rotation between said sliding member and said oscillating member causes a movement of said sliding member at right angles to the movement of rotation and consequent engagement and jamming together of said three members, said sliding member having teeth or their equivalent on its two sides adapted to positively engage with corresponding teeth on said oscillating member and said sliding member.

The invention further consists in a clutch as above described having the larger teeth on the slider on the side which co-operates with the oscillating member, so that the inertia of the sliding member tends to assist the engagement and disengagement of the smaller sets of teeth.

The invention also consists in providing on the oscillator a suitable stop or sets of stops or their equivalent engaging with the slider or with the additional inertia member to prevent movement of the slider relatively to the oscillator on one side of the mean relative position, while another stop or set of stops, or the same stops suitably displaced prevents movement of relative rotation of the slider relatively to the oscillator on the other side of the mean position with or without a third stop or set of stops or third position of the same stops, preventing any movement on either side of the mean relative position of the slider relatively to the oscillator.

The invention also consists in an improved clutch or unidirectional driving device comprising a sliding member, in the form of a ring having teeth on its two faces situated between an oscillating member and a rotating member having corresponding teeth; the teeth on one side of the slider being larger and of less inclination than the teeth on the other side so that engagement and disengagement of the smaller teeth is effected by relative movement of the slider and the oscillating member or of the slider and the rotating member.

The invention further consists in a clutch or unidirectional driving device comprising a sliding member in the form of a ring having teeth on its two faces, one set of teeth being of smaller depth and adapted to engage and disengage with teeth on a rotating member, while the other set of teeth are larger and are always between similar teeth on the oscillating member with which they are adapted to cooperate to give the slider a longitudinal movement in the direction to cause engagement and disengagement of the smaller teeth on the slider with the teeth on the rotating member.

The invention also consists in providing means by which the small teeth on the slider are kept out of contact with the teeth with which they co-operate for driving, during the period at which the rotor is overrunning the slider.

The invention further consists in the improved unidirectional driving mechanism and means for reversing the direction of rotation or entirely disengaging the oscillator from the rotor hereinafter described.

Referring to the accompanying drawings:—

Figure 2 is a sectional elevation showing a form of the mechanism, while

Figures 3, 4 and 5 show the same arrangement in different positions;

Figures 6, 7, 8 and 9 show parts of the mechanism in the positions which they occupy respectively in Figures 2, 3, 4, and 5.

Figure 1:
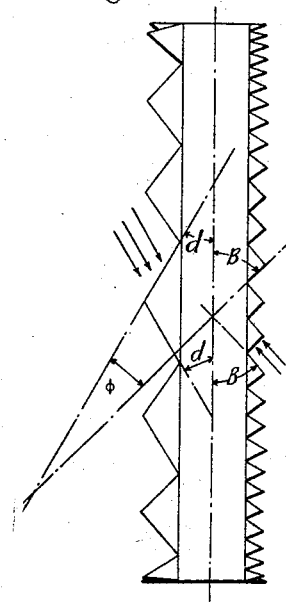
Figure 1 is a diagram showing the inclination of the teeth on the slider.
Figure 15:
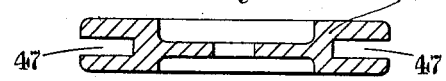
Figure 15 is a section on the line 15—15, Figure 14.
Figure 16:
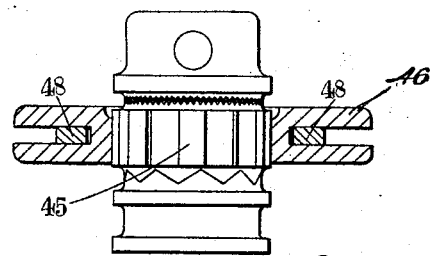
Figure 16 is a sectional plan of the mechanism shown in Figure 14.

The method of constructing the teeth will be readily understood from the diagram, Figure 1. The angle of inclination to a plane perpendicular to the axis of the driving faces of the large teeth on the slider $\alpha$ must be equal to the angle of inclination $\beta$ of the driving faces of the small teeth to the same plane minus an angle at least equal to the angle of friction, that is if $\alpha$ is the angle of inclination of the large teeth, $\beta$ the angle of inclination of the small teeth, and $\phi$ an angle greater than the angle of friction, we must have:—$\alpha = \beta - \phi$. Friction surfaces may, if desired, be employed instead of the small teeth. In this case the angle $\beta$ corresponds to the angle of friction between such frictional surfaces and if the angle $\alpha$ of the teeth or helix does not fulfill nearly enough the above relation the parts either slip or become firmly locked together and disengagement does not take place except under application of considerable forces.

The two sets of conditions, namely, that in which the interengaging faces of the slider and rotor are respectively serrated and smooth, may be included in one formula. The angle $\alpha + \phi$ that is to say, the angle between the faces of the teeth and the plane transverse to the axis of rotation plus an angle at least equal to—in practice somewhat greater than—the angle of friction between the surfaces in contact, I term the "driving angle." The "driving angle" corresponding to the oscillator and slider is $\alpha + \phi$, and there will of course be a driving angle $\beta + \psi$, say, corresponding to the slider and rotor. The general condition is $\alpha + \phi$ not greater than $\beta + \psi$. If the opposing faces of the slider and rotor have teeth, $\psi$ may be left out of account, and we have as above $\alpha+\phi$ not greater than $\beta$. If these faces are plane $\beta=0$, and we have $\alpha+\phi$ not greater than $\psi$. In this last case $\psi$ is of course the same as $\beta$ of the last paragraph.

In practice it has been found that the angle $\phi$ must exceed the angle of friction between the materials employed when dry. Probably because the film of oil is temporarily expelled by the high pressure between the teeth at the moment of engagement. A value of the angle $\phi$ which I have found suitable is about 15 degrees. If the teeth are constructed in this manner a wedging action is obtained which gives a positive sliding action to the slider causing the small teeth on the friction surfaces to engage satisfactorily so that all parts then become jammed together and slip or disengagement during the driving period is prevented.

In all the mechanisms the clearances between the oscillator, slider and rotor must be arranged in such a way that when the large teeth are in mesh, the small teeth are clear in order to allow relative rotation.

In the modification of the invention shown in Figures 2 to 16 which is suitable for effecting rotation of the driven shaft in either direction at will or for giving a free and also a locked position, if required, the oscillator 41 is formed with large teeth 42 equally inclined on both sides as shown in Figure 1. The small teeth 43 are also equally inclined and correspond with the teeth on the rotor 44. Keys 45 are provided on the slider and the ring 46 is capable of sliding freely in the axial direction relatively to the slider on these keys. Grooves 47 are provided in the ring 46 adapted to engage with the prongs 48 of a fork which is carried by a sleeve 49 on an actuating rod 50 which is capable of being set in four different positions and held by the spring detent 51 engaging in notches 52 on the actuating rod 50.

The various parts are shown in four different positions in Figures 2, 3, 4 and 5; corresponding views being shown at Figures 6, 7, 8 and 9, and Figures 10, 11, 12 and 13. The oscillator carries a pin 53 which is cylindrical in some parts and cut away as illustrated in others. This pin passes through a circular aperture 54 in the ring 46 which is carried by the slider.

Figure 10:
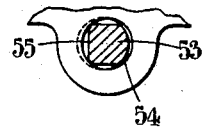
Figures 10, 12, 13 and 11 are sections at right angles to those shown in Figures 4, 7, 6 and 9 showing the arrangement of the stops for driving in either direction as required, the free position and the position for obtaining a locked gear.

In the position shown in Figures 2, 6 and 10, angular movement of the ring 46 and therefore of the slider relatively to the oscillator 41 is allowed by reason of the notch or cut away portion 55 which is opposite the ring 46 in this position. The result of this is that for movement in one direction the inertia of the ring causes the slider to ride up the large teeth on the oscillator and causes engagement of its small teeth with the small teeth on the rotor.

Figure 13:
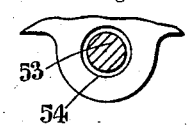
Figure 14:
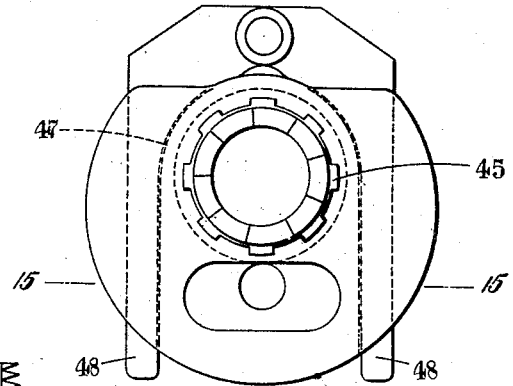
Figure 14 is an elevation at right angles to Figures 2, 3, 4 and 5 showing the means for changing the sense of rotation of the mechanism.

In the position shown in Figures 3, 7 and 13, the aperture in the ring is prevented from angular movement relative to the oscillator by reason that around its whole circumference it is opposite a cylindrical portion of the pin so that no relative movement is possible, with the result that the large teeth cannot ride in either direction therefore allowing free movement between the slider and the rotor in both directions.

Figure 12:
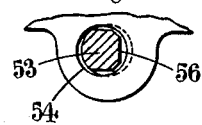

In the positions shown in Figures 4, 8 and 12, the opposite side of the aperture in the ring 46 is opposite a notch 56 in the pin on the oscillator, so that relative movement between the slider and the oscillator is possible in the opposite direction to that in which it can occur in the position shown in Figures 2, 6 and 10, with the result that engagement between the slider and rotor takes place due to relative movement and riding up of the large teeth giving rotation in the opposite direction.

Figure 11:
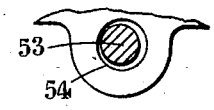

In the position shown in Figures 5, 9 and 11, the ring can move relatively to the slider in either direction so that relative movement and riding up of the large teeth can take place in either direction locking the oscillator, slider and the rotor together in either direction.

I claim:

1. Unidirectional reversing driving mechanism, comprising in combination an oscillator, a rotor, a slider situated between them cooperating with the oscillator but movable along the axis of rotation to effect engagement with the rotor and adjustable means for limiting the relative angular movement of the oscillator and slider, the adjacent faces of the oscillator and slider being similar to one another and symmetrical about any plane containing the axis of rotation, and the adjacent faces of the slider and rotor being also similar to one another and symmetrical about any plane containing the axis of rotation, and the driving angle between the oscillator and slider being not greater than the driving angle between the slider and rotor.

2. Unidirectional reversing driving mechanism, comprising in combination an oscillator, a rotor, a slider situated between them cooperating with the oscillator but movable along the axis of rotation to effect engagement with the rotor and adjustable means for limiting the relative angular movement of the oscillator and slider, the adjacent faces of the oscillator and slider, and of the slider and rotor being provided with symmetrical teeth.

3. Unidirectional reversing driving mechanism, comprising in combination an oscillator, a rotor, a slider situated between them cooperating with the oscillator but movable along the axis of rotation to effect engagement with the rotor and adjustable means for limiting the relative angular movement of the oscillator and slider, the adjacent faces of the oscillator and slider and of the slider and rotor being provided with symmetrical teeth, and the driving angle between the oscillator and slider being not greater than the driving angle between the slider and rotor.

4. Unidirectional reversing driving mechanism, comprising in combination an oscillator and a rotor, and a slider situated between them cooperating with the oscillator, but movable along the axis of rotation to effect engagement with the rotor, and a ring splined on the slider engaging adjustably with stops on the oscillator to limit the relative angular movement of the oscillator and slider and thus to provide for reversal, free running, or locking of the rotor.

5. Unidirectional reversing driving mechanism, comprising in combination an oscillator and a rotor, and a slider situated between them cooperating with the oscillator but movable along the axis of rotation to effect engagement with the rotor, and a ring splined on the slider engaging adjustably with stops on the oscillator to limit the relative angular movement of the oscillator and slider and thus to provide for reversal, free running or locking of the rotor, all the parts being arranged so that the inertia of the slider tends to assist engagement and disengagement between the slider and the rotor.

6. Unidirectional reversing driving mechanism, comprising in combination an oscillator and a rotor, and a slider situated between them cooperating with the oscillator but movable along the axis of rotation to effect engagement with the rotor, and a ring splined on the slider engaging adjustably with stops on the oscillator to limit the relative angular movement of the oscillator and slider and thus to provide for reversal, free running or locking of the rotor, the ring being loaded so as to augment the inertia of the slider.

In testimony whereof I affix my signature.

GEORGE CONSTANTINESCO.